(12) United States Patent
Watanabe et al.

(10) Patent No.: US 10,486,342 B2
(45) Date of Patent: Nov. 26, 2019

(54) APPARATUS FOR TAKING OUT MOLDED PRODUCT

(71) Applicant: Yushin Precision Equipment Co., Ltd., Kyoto (JP)

(72) Inventors: Fumitake Watanabe, Kyoto (JP); Kazutaka Ando, Kyoto (JP); Atsushi Shirasaki, Kyoto (JP)

(73) Assignee: YUSHIN PRECISION EQUIPMENT CO., LTD., Kyoto (JP)

( * ) Notice: Subject to any disclaimer, the term of this patent is extended or adjusted under 35 U.S.C. 154(b) by 0 days.

(21) Appl. No.: 15/847,399

(22) Filed: Dec. 19, 2017

(65) Prior Publication Data

US 2018/0178417 A1    Jun. 28, 2018

(30) Foreign Application Priority Data

Dec. 22, 2016    (JP) .................................. 2016-248769

(51) Int. Cl.
| | |
|---|---|
| B65G 27/24 | (2006.01) |
| B29C 33/44 | (2006.01) |
| B29C 37/00 | (2006.01) |
| B29C 45/42 | (2006.01) |

(52) U.S. Cl.
CPC .......... B29C 37/0007 (2013.01); B29C 33/44 (2013.01); B29C 45/42 (2013.01); B65G 27/24 (2013.01)

(58) Field of Classification Search
None
See application file for complete search history.

(56) References Cited

U.S. PATENT DOCUMENTS

| | | | | |
|---|---|---|---|---|
| 5,688,103 A | * | 11/1997 | Tsuji .................... | B21D 43/00 198/464.1 |
| 5,799,543 A | * | 9/1998 | Nagai .................... | B25J 9/023 74/490.09 |
| 6,675,955 B2 | * | 1/2004 | Nasser-Moghaddassi ................... | B65G 27/24 198/766 |
| 7,976,260 B2 | * | 7/2011 | Hirata ................... | B23Q 7/045 198/346.2 |

(Continued)

FOREIGN PATENT DOCUMENTS

| | | |
|---|---|---|
| JP | 2004-218818 | 8/2004 |
| JP | 2004-223798 | 8/2004 |

(Continued)

OTHER PUBLICATIONS

U.K. Search Report dated Mar. 21, 2018, 4 pages.

*Primary Examiner* — Kavel Singh
(74) *Attorney, Agent, or Firm* — Rankin, Hill & Clark LLP

(57) ABSTRACT

There is provided an apparatus for taking out a molded product, the apparatus being capable of suppressing displacement vibration of an attachment mounted at a leading end of an approach frame by means of active control using an electromagnetic actuator that has necessary power. One or more electromagnetic actuators are disposed at a portion of the approach frame, positioned opposite to the attachment with respect to a movable base. An active vibration suppressing system suppresses the displacement vibration of the attachment by causing the one or more electromagnetic actuators to generate a vibration in the same phase as the displacement vibration of the attachment.

10 Claims, 12 Drawing Sheets

(56) References Cited

U.S. PATENT DOCUMENTS

2013/0004613 A1\* 1/2013 Hashimoto ............. B29C 33/44
425/443
2017/0165888 A1 6/2017 Watanabe et al.

FOREIGN PATENT DOCUMENTS

| JP | 2004-249629 | 9/2004 |
| JP | 2004-263767 | 9/2004 |
| JP | 2010-111012 | 5/2010 |
| JP | 2017-105190 | 6/2017 |

\* cited by examiner

APPARATUS FOR TAKING OUT MOLDED PRODUCT

TECHNICAL FIELD

The present invention relates to an apparatus for taking out a molded product, the apparatus being capable of reducing displacement vibration of an attachment mounted on an approach frame in a short time.

BACKGROUND ART

JP 2010-111012 A (Patent Document 1) discloses an apparatus for taking out a molded product, the apparatus including a take-out head (attachment) driven by a drive source to take out a molded product from a molding machine, a table to which a vibration component of the take-out head is input, and control means for controlling the moving speed of the take-out head to suppress displacement vibration of the take-out head by driving a servomotor (drive source) by feedforward control using the table, thereby suppressing vibration of the take-out head.

JP 2004-223798 A (Patent Document 2) discloses a vibration suppressing system for an apparatus for taking out a molded product, the apparatus being operable to control the movement of a chuck for holding a molded product between predetermined positions to take out the molded product from a resin molding machine, in which at least one of the chuck and a movable body for moving the chuck is provided with a dynamic vibration absorbing device operable to generate vibration for negating the residual vibration of the movable body when the movement of the chuck is stopped. The dynamic vibration absorbing device vibrates a fluid sealed in a container such that the fluid can flow therein, and converges the vibration at an attenuation rate according to the viscosity of the fluid.

Patent Document

[Patent Document 1] JP 2010-111012 A
[Patent Document 2] JP 2004-223798 A

SUMMARY OF INVENTION

Technical Problem

With the related art described in Patent Document 1, however, it takes time to suppress displacement vibration. In addition, it is difficult to set conditions for suppressing vibration.

With the related art according to Patent Document 2, it is necessary to prepare individual dynamic vibration absorbing devices that utilize the viscosity of the fluid and generate appropriate resonant vibration according to varied take-out conditions, which lacks versatility. Then, the inventors conceived of using an electromagnetic actuator as the dynamic vibration absorbing device. Ideally, it is considered to be most efficient to mount the electromagnetic actuator to the attachment including the take-out head attached to the leading end of an approach frame. Depending on the structure of the molding machine, however, the clearance between a pair of molding dies of the molding machine may be considerably small. In some cases, the attachment including the take-out head is heavy, and it may be required to use a large powerful electromagnetic actuator in order to quickly suppress vibration of the attachment.

Accordingly, it is an object of the present invention to provide an apparatus for taking out a molded product, the apparatus being capable of suppressing displacement vibration of an attachment mounted at a leading end of an approach frame by means of active vibration suppressing control using an electromagnetic actuator that has necessary power.

Solution to Problem

The present invention is directed to an apparatus for taking out a molded product, the apparatus including a positioning servomechanism, a pull-out frame, one or more movable bases, one or more approach frames, one or more attachments, and an active vibration suppressing system. The one or more movable bases are movably provided on the pull-out frame, and controlled by the positioning servomechanism. The one or more approach frames are respectively attached to the movable bases. The one or more attachments are respectively mounted at leading ends of the approach frames. The active vibration suppressing system is configured to perform active control to suppress a displacement vibration of the one or more attachments using a vibration generated by driving one or more actuators. The one or more approach frames include an approach frame having an attachment mounted at a leading end thereof and configured to take out a molded product from a molding die of a molding machine or to be attached with an insert component to be inserted into the molding die, and an approach frame having an attachment configured to remove a waste part from the molded product. It is not necessary that the approach frames should be elevated and lowered in the vertical direction, and the approach frames may be elevated and lowered in an oblique direction. The term "attachment" as used herein refers to various types of attached parts mounted on the approach frames. The attachment may include a take-out head, a posture controlling device including a reverse section to which the take-out head is mounted, a chuck device, a cutter device, etc. In the present invention, the one or more actuators are one or more electromagnetic actuators. The one or more electromagnetic actuators are disposed at at least one of the one or more movable bases, or the one or more electromagnetic actuators are disposed at a portion of one of the approach frames, positioned opposite to the attachment mounted on the one of the approach frames with respect to one of the movable bases. In the latter case, the one or more electromagnetic actuators are disposed on one of the approach frames so as to be opposed to the attachment mounted on the same approach frame with the movable base for this approach frame being interposed between the one or more electromagnetic actuators and the attachment.

When applying the present invention, the distance between the attachment and the one or more electromagnetic actuators is long. However, there exists a relatively large space around the movable base and around a portion of the approach frame positioned opposite to the attachment with respect to the movable base. Therefore, the one or more electromagnetic actuators having power required to suppress a displacement vibration of the attachment can be mounted without caring about a collision with an object in the surroundings. Particularly, if the one or more electromagnetic actuators are mounted on the movable base, the vibration of the electromagnetic actuators can be amplified utilizing the weight of the movable base, thereby enhancing the vibration suppressing effect.

The one or more actuators may be disposed on both of one of the movable bases and the attachment provided on the approach frame held by the one movable base. If the one or more actuators are mounted on both of the movable base and the attachment, a displacement vibration of the attachment can be further quickly suppressed.

The active vibration suppressing system includes a displacement vibration detecting section configured to detect the displacement vibration of the one or more attachments, and the displacement vibration detecting section drives the one or more electromagnetic actuators so as to reduce the displacement vibration detected by the displacement vibration detecting section. When the one or more electromagnetic actuators are disposed at a portion of the one approach frame, positioned opposite to the attachment with respect to the one movable base, the active vibration suppressing system can suppress the displacement vibration of the attachment by causing the one or more electromagnetic actuators to generate a vibration in the same phase as the displacement vibration of the attachment. In this case, the movable base serves as the fulcrum of the approach frame, and therefore it is necessary that a vibration applied from the one or more electromagnetic actuators to the approach frame should be in the same phase as the displacement vibration of the attachment. When the one or more electromagnetic actuators are disposed at a portion of the approach frame, positioned opposite to a held portion of the approach frame held by the movable base when the approach frame is lowered to the lowermost position, a vibration of the attachment is suppressed by applying to the attachment a vibration of the one or more electromagnetic actuators amplified using the principle of leverage. When the one or more electromagnetic actuators are disposed on the one movable base, the active vibration suppressing system suppresses the displacement vibration of the attachment by causing the one or more electromagnetic actuators to generate a vibration in a phase delayed by $0 \leq \varphi/\pi 4$ from that of the displacement vibration of the attachment. In this case, the movable base serves as the point of fulcrum of the approach frame. Thus, in theory, a displacement vibration of the attachment can be suppressed by applying to the movable base a vibration in the same phase as the displacement vibration of the attachment. In practice, however, there is a delay in transmission of a force from the movable base to the approach frame, and therefore the one or more electromagnetic actuators are preferably caused to generate a vibration in a phase delayed by $0 \leq \varphi \pi/4$ from that of the displacement vibration of the attachment.

The displacement vibration detecting section may be constituted from a vibration detecting sensor configured to directly detect a vibration of the attachment. Alternatively, the displacement vibration detecting section may be configured to indirectly detect a vibration of the attachment based on a feedback signal of a servomotor. When indirect detection such as the latter vibration detecting section is adopted, there is no need to make an improvement to, or directly attach a sensor to, the attachment or the like of the apparatus for taking out a molded product. Thus, such a configuration can be easily applied to the existing apparatus for taking out a molded product.

Here, a Z direction is defined as a direction in which one of the one or more approach frames is elevated and lowered, a Y direction is defined as a direction orthogonal to the Z direction, in which the attachment mounted on the one of the one or more approach frames approaches to or retracts from the molded product within the molding die, and an X direction is defined as a direction orthogonal to the Y and Z directions. The one or more electromagnetic actuators include a first electromagnetic actuator operable to suppress at least the displacement vibration of the attachment as caused in the Y direction. This is because, in the apparatus for taking out a molded product, a vibration of the attachment as caused in the Y direction significantly affects take-out of the molded product and insertion of the insert component.

The one or more electromagnetic actuators may include a first electromagnetic actuator operable to suppress the displacement vibration of the attachment as caused in the Y direction and a second electromagnetic actuator operable to suppress the displacement vibration of the attachment as caused in the X direction. This is because the displacement vibration of the attachment as caused in the X direction, in particular, significantly affects the positioning accuracy in releasing the molded product at a releasing position and inserting the insert component.

The one or more electromagnetic actuators may include a first electromagnetic actuator operable to suppress the displacement vibration of the attachment as caused in the Y direction, a second electromagnetic actuator operable to suppress the displacement vibration of the attachment as caused in the X direction, and a third electromagnetic actuator operable to suppress the displacement vibration of the attachment as caused in the Z direction. The active control can be performed at all times if the first to third electromagnetic actuators are provided.

A motor included in the positioning servomechanism operable to move one of the one or more movable bases may be constituted from an AC servomotor, and a transport mechanism of belt-type, rope-type, or carriage-type may be provided between the AC servomotor and the movable base.

DESCRIPTION OF EMBODIMENTS

An apparatus for taking out a molded product according to embodiments of the present invention will be described in detail below with reference to the accompanying drawings.

First Embodiment

<Configuration of Apparatus for Taking Out Molded Product>

Figure 1A:
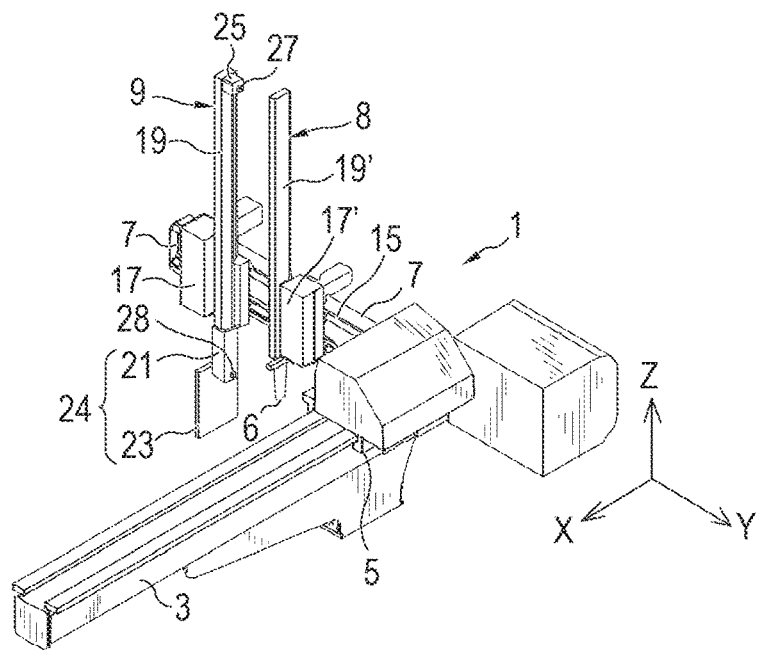
FIG. 1A illustrates the overall configuration of an apparatus 1 for taking out a molded product according to a first embodiment of the present invention.
Figure 1B:
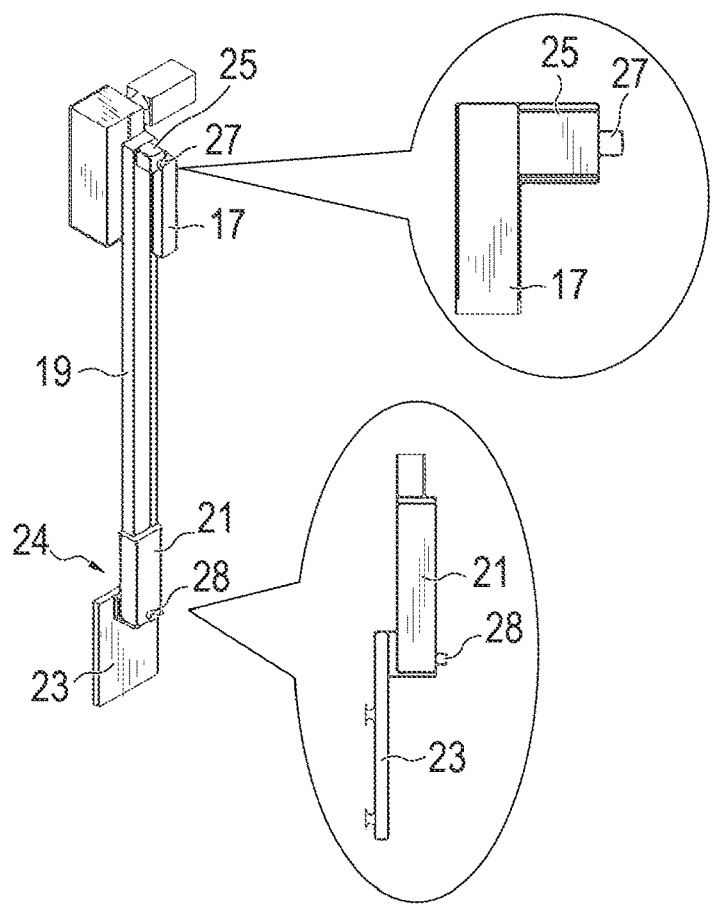
FIG. 1B is an enlarged perspective view of an essential portion of the apparatus.

FIG. 1A illustrates the overall configuration of an apparatus 1 for taking out a molded product according to an embodiment of the present invention. FIG. 1B is an enlarged perspective view of an essential portion of the apparatus. The apparatus 1 is a traverse-type apparatus for taking out a molded product. A base portion of the apparatus 1 is supported by a fixed platen of a molding machine (not illustrated). The apparatus 1 illustrated in FIGS. 1A and 1B includes a lateral frame 3, a first transfer body 5, a pull-out frame 7, a runner elevating unit 8, and a molded product-suctioning elevating unit 9. The lateral frame 3 has a cantilever beam structure in which the lateral frame 3 extends in the X direction which is horizontal and orthogonal to the longitudinal direction of the molding machine, not illustrated. The first transfer body 5 is supported by the lateral frame 3, and advanced and retracted in the X direction along the lateral frame 3 by a drive source which is an AC servomotor 11 included in a servomechanism. The pull-out frame 7 is provided at the first transfer body 5, and extends in the Y direction which is parallel to the longitudinal direction of the molding machine. The runner elevating unit 8 and the molded product-suctioning elevating unit 9 are supported by the pull-out frame 7 to be movable in the Y direction by a drive source which is an AC servomotor 13 (see FIG. 2) included in the servomechanism.

The runner elevating unit 8 includes an approach frame 19' that constitutes an elevating frame that is elevated and lowered in the Z direction and provided on a movable base 17' movably supported by the pull-out frame 7. The movable base 17' is movable in the Y direction when a belt 15 is rotationally driven by an AC servomotor, not illustrated. The approach frame 19' is elevated and lowered in the vertical direction (Z direction) by a drive source 18'. The approach frame 19' includes a chuck 6 that serves as an attachment for holding a runner to be wasted.

Figure 2:
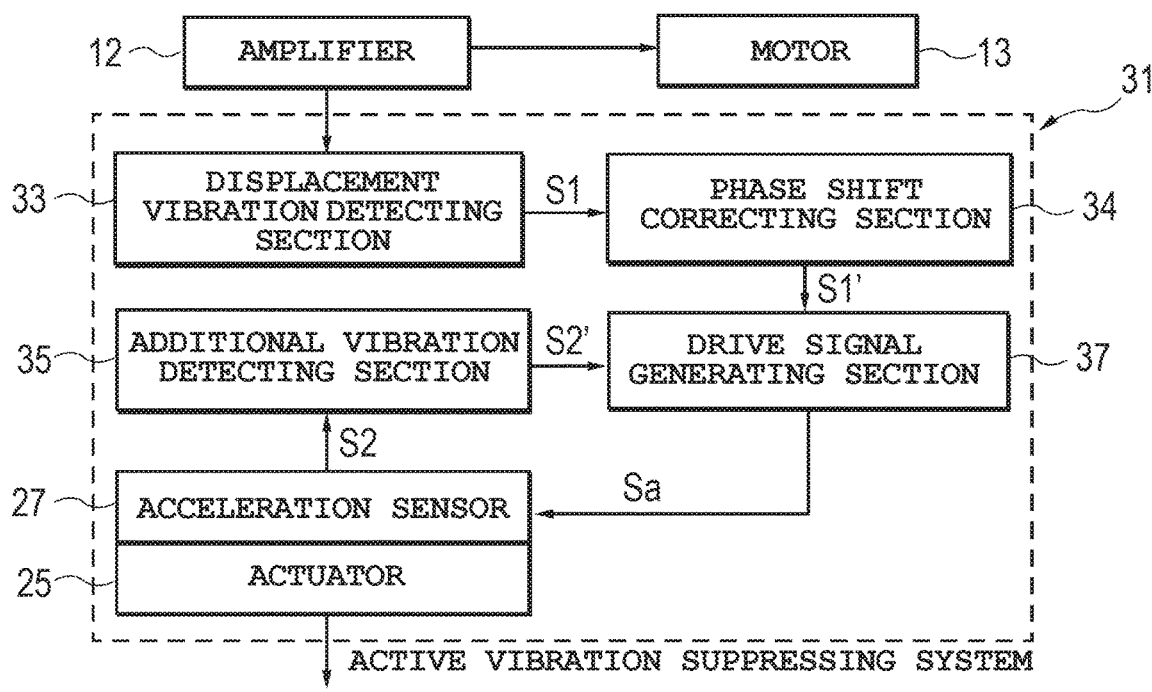
FIG. 2 is a block diagram illustrating the configuration of a control section.

A movable base 17 which is included in the molded product-suctioning elevating unit 9 is moved in the Y direction on the pull-out frame 7 when the belt 15 is rotationally driven by the AC servomotor 13 (FIG. 2). The molded product-suctioning elevating unit 9 includes an approach frame 19, a reverse unit 21, and a take-out head 23. The approach frame 19 is elevated and lowered in the vertical direction (Z direction) by a drive source 18. The reverse unit 21 serves as a posture controller to be rotated about a frame line of the approach frame 19. The take-out head 23 is provided at the reverse unit 21. In the embodiment, the reverse unit 21 and the take-out head 23 constitute an attachment 24. If the reverse unit 21 is not provided, the take-out head 23 constitutes the attachment 24. In the embodiment, an electromagnetic actuator 25 is mounted at an upper end portion of the approach frame 19 which is positioned above the center of the movable base 17. An acceleration sensor 27 is attached to a mover of the electromagnetic actuator 25. In FIGS. 1A and 1B, an acceleration sensor 28 is provided on the reverse unit 21. The acceleration sensor 28 outputs a displacement vibration detection signal S1 including information on a displacement vibration frequency component proportional to a displacement vibration of the attachment 24 in the horizontal direction (Y direction). In the embodiment, however, as illustrated in FIG. 2, the acceleration sensor 28 is removed, and a motor current signal or a motor torque signal of the AC servomotor 13, or a signal proportional to the motor current signal or the motor torque signal, is utilized as the displacement vibration detection signal proportional to the displacement vibration.

<Configuration of Active Vibration Suppressing System>

The apparatus 1 according to the embodiment includes an active vibration suppressing system 31 illustrated in FIG. 2 and provided at the control section not illustrated in FIGS. 1A and 1B. The active vibration suppressing system 31 includes a displacement vibration detecting section 33, a phase shift correcting section 34, the electromagnetic actuator 25, an additional vibration detecting section 35, and a drive signal generating section 37. The electromagnetic actuator 25 is mounted at the upper end portion of the approach frame 19 to suppress a vibration of the attachment 24 as caused in the Y direction. The electromagnetic actuator 25 is operable to apply a vibration to the attachment 24 using the movable base 17 as the fulcrum based on the principle of leverage. In particular, the electromagnetic actuator is operable to generate a vibration with desired power and at a desired frequency. In the embodiment, an electromagnetic actuator manufactured by Sinfonia Technology Co., Ltd. (product number: RM040-021) is used. In the embodiment, the attachment 24 is constituted from the reverse unit 21 mounted on the approach frame 19 and the take-out head 23 mounted on the reverse unit 21. In order to suppress a vibration as caused in the horizontal direction (Y direction or X direction), the electromagnetic actuator 25 is mounted such that a vibration in the horizontal direction (Y direction or X direction) is applied to the attachment 24 by a vibration generated by the electromagnetic actuator 25. In order to suppress a vibration as caused in the vertical direction (Z direction), the electromagnetic actuator 25 may be mounted to generate a vibration in the vertical direction (Z direction).

In the embodiment, the displacement vibration detecting section 33 is constituted from a filter and an integrator, and outputs the displacement vibration detection signal S1 including information on a displacement vibration frequency component proportional to a displacement vibration of the attachment 24 in the horizontal direction (Y direction). The displacement vibration includes a plurality of vibration frequency components based on a first-order vibration, a second-order vibration, and so forth caused by motions of the approach frame 19 and the attachment 24. The vibration frequency components included in the displacement vibration are varied according to the structure of a transport mechanism (belt-type or carriage-type) provided between the AC servomotor 13 and the movable base 17 on which the approach frame 19 is mounted. In the embodiment, the displacement vibration detecting section 33 outputs, as the displacement vibration detection signal proportional to the displacement vibration of the attachment, a motor current signal or a motor torque signal of the servomotor 13 used in the positioning servomechanism operable to move the approach frame in the horizontal direction (Y direction), or a signal proportional to the motor current signal or the motor torque signal. It is necessary that the attachment 24 of the apparatus 1 should be advanced into a space between two molding dies of the molding machine. Therefore, there is a limit to the increase in size of the attachment 24 at which the electromagnetic actuator 25 is mounted, and there is little room to dispose a sensor operable to detect motion of the attachment 24 to which the electromagnetic actuator 25 is mounted, in proximity to the molding die of the molding machine. For such reasons, engineers may have thought that the active control might be effective in suppressing a vibration of the attachment 24, but they have not proposed suppressing a vibration of the take-out head by means of the active control.

The inventors, who studied application of the active control to the apparatus for taking out a molded product, have found that a displacement vibration frequency component proportional to a displacement vibration of the attachment 24 as caused in the horizontal direction or the vertical direction is included in a motor current signal or a motor torque signal of the motor used in the servomechanism operable to move the approach frame in the horizontal direction or the vertical direction, or a signal proportional to the motor current signal or the motor torque signal. This finding eliminates the need to dispose a sensor operable to measure a vibration of the attachment 24 as caused in the horizontal direction or to dispose a sensor operable to measure a vibration of the take-out head as caused in the horizontal direction around the molding die of the molding machine.

Then, in the embodiment, the displacement vibration detecting section 33 detects, as the displacement vibration detection signal S1, a motor current signal or a motor torque signal of the servomotor 13 used in the servomechanism operable to move the approach frame 19 in the horizontal direction (Y direction), or a signal proportional to the motor current signal or the motor torque signal. If information on the displacement vibration frequency component is obtained from the signal S1, it is no longer necessary to provide a special sensor operable to detect a vibration of the attachment 24 in the horizontal direction (Y direction) around the attachment 24 or the molding die of the molding machine. As a result, it has become practically possible to apply the active control to the apparatus for taking out a molded product. In the embodiment, in order to actively suppress a vibration of the approach frame 19 in the horizontal direction (Y direction), the displacement vibration detecting section 33 acquires a motor current signal or a torque signal from an output from a motor driving amplifier 12 for the servomotor 13. Further, in order to suppress a vibration of the approach frame 19 as caused in the vertical direction, the electromagnetic actuator 25 may be driven based on a motor current signal or a torque signal acquired from an output from a motor driving amplifier for a motor operable to move the approach frame 19 in the vertical direction. In this case, the mount position of the electromagnetic actuator 25 may be varied such that the electromagnetic actuator 25 generates a vibration in the vertical direction.

Figure 3A:
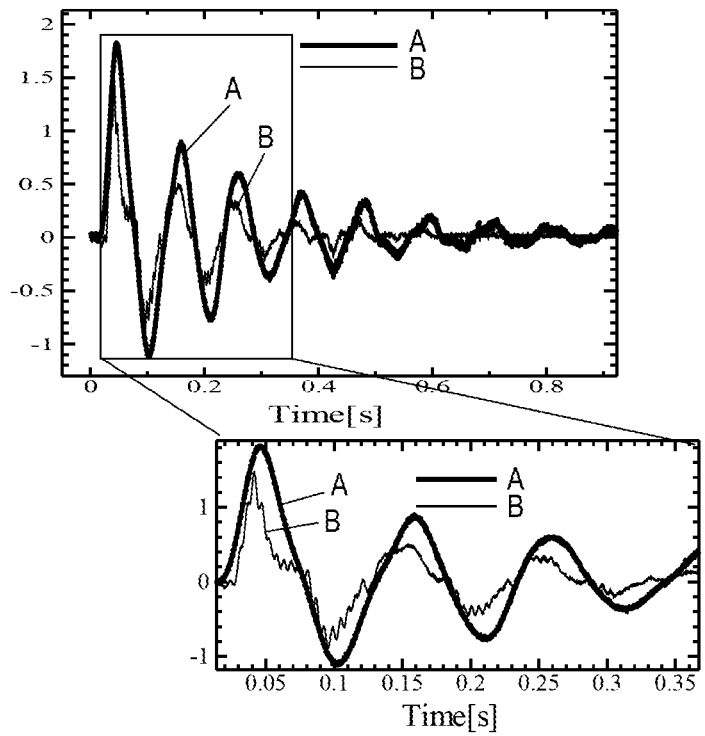
FIG. 3A is a waveform chart illustrating a vibration waveform representing the state of vibration of a take-out head during pull-out operation as measured by a laser displacement gauge and a torque command waveform for a servomotor in contrast with each other.
Figure 3B:
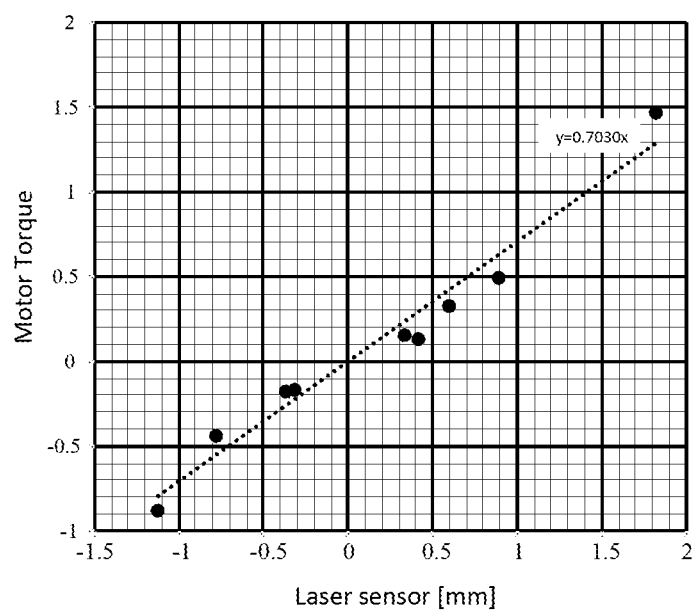
FIG. 3B illustrates the proportional relationship between the vibration waveforms indicated by the peak values of the vibration waveforms.

FIG. 3A is a waveform chart illustrating a vibration waveform A representing the state of vibration of the attachment 24 during pull-out operation as measured by a laser displacement gauge (available from Keyence Corporation (product name: IL-S100)) and a torque command waveform B for the servomotor 13 in contrast with each other. The torque command waveform B was taken from a torque command output terminal of a servo amplifier available from Fuji Electric Co., Ltd. (product name: RYT201D5-LS2-Z25). When the waveform A and the waveform B are compared with each other, it is found that the waveforms A and B are proportional to each other when seen in terms of the peak values of the waveforms, although there is a phase shift therebetween. This is illustrated in FIG. 3B. This is also found from the result of plotting the absolute values of points on the torque command waveform and the absolute values of outputs from the laser displacement gauge. This relationship is also found to appear for the motor current signal of the motor. When focus is placed on the first peaks and the second peaks of the two waveforms, it is seen that there is a shift (lead) of 0.03 to 0.04 seconds between rises of the two waveforms.

The phase shift correcting section 34 corrects a phase shift of the displacement vibration detection signal S1 outputted from the displacement vibration detecting section 33 based on predetermined phase shift information, and generates a corrected displacement vibration detection signal S1'. A phase shift due to various factors such as the configuration of the displacement vibration detecting section 33 is caused between the displacement vibration detection signal S1 and the actual displacement vibration. Once setting is performed for the apparatus for taking out a molded product, the shape and the weight of the attachment 24 and the molded product to be taken out will not be varied. Thus, the phase shift can be calculated in advance by performing an advance measurement before take-out operation is started. Thus, in the embodiment, a phase shift of the displacement vibration detection signal S1 is corrected based on predetermined phase shift information to generate a corrected displacement vibration detection signal S1' to prevent oscillation based on the phase shift.

The additional vibration detecting section 35 detects an additional vibration as caused in the horizontal direction (Y direction) generated by the electromagnetic actuator 25, and outputs an additional vibration detection signal S2' including information on an additional vibration frequency component of the additional vibration. If vibration suppression operation is performed by causing the electromagnetic actuator 25 to operate using only the corrected displacement vibration detection signal S1', an additional vibration frequency component of the electromagnetic actuator 25 in the horizontal direction is included in the displacement vibration frequency component. If the additional vibration frequency component is not taken into consideration, however, a vibration cannot be suppressed using the electromagnetic actuator 25 quickly or without causing oscillation. In the embodiment, the additional vibration detecting section 35 is constituted from the acceleration sensor 27 attached to the mover of the electromagnetic actuator 25 and operable to detect acceleration of the mover. Currently, a semiconductor acceleration sensor, for example, may be used as the acceleration sensor 27. Semiconductor acceleration sensors sized to be attachable to the mover are available. In the embodiment, an acceleration sensor available from Kionix, Inc. (product name: KXR94-2050) is used.

The drive signal generating section 37 generates a drive signal required for active control of the electromagnetic actuator 25 to suppress a displacement vibration of the attachment 24 by causing the electromagnetic actuator 25 to generate a vibration in the same phase as the displacement vibration of the attachment 24, based on the displacement vibration frequency component included in the corrected displacement vibration detection signal S1' and the additional vibration frequency component included in the additional vibration detection signal. A vibration may not be suppressed with only a drive signal for driving the actuator as generated based on only the displacement vibration detection signal S1 including information on the displacement vibration frequency component. This is because an additional vibration (additional vibration frequency component) generated by a vibration of the actuator is included in the displacement vibration frequency component. Thus, a drive signal Sa is used. The drive signal Sa is generated by removing the additional vibration detection signal S2' from the corrected displacement vibration detection signal S1'. The corrected displacement vibration detection signal S1' is obtained by correcting the phase of the detection signal S1 including information on the displacement vibration frequency component. The additional vibration detection signal S2' is proportional to the speed obtained by integrating an acceleration signal S2 from the acceleration sensor 27 including information on the additional vibration frequency component due to the additional vibration of the vibrator of the electromagnetic actuator 25 operable to generate a vibration for suppressing a vibration of the attachment 24 as caused in the horizontal direction. Consequently, it is possible to increase attenuation of the additional vibration to prevent oscillation, which makes the active control utilizing the electromagnetic actuator 25 more effective. As a result, it is possible to reliably suppress a vibration of the attachment 24 in a short time compared to the related art.

Figure 4:
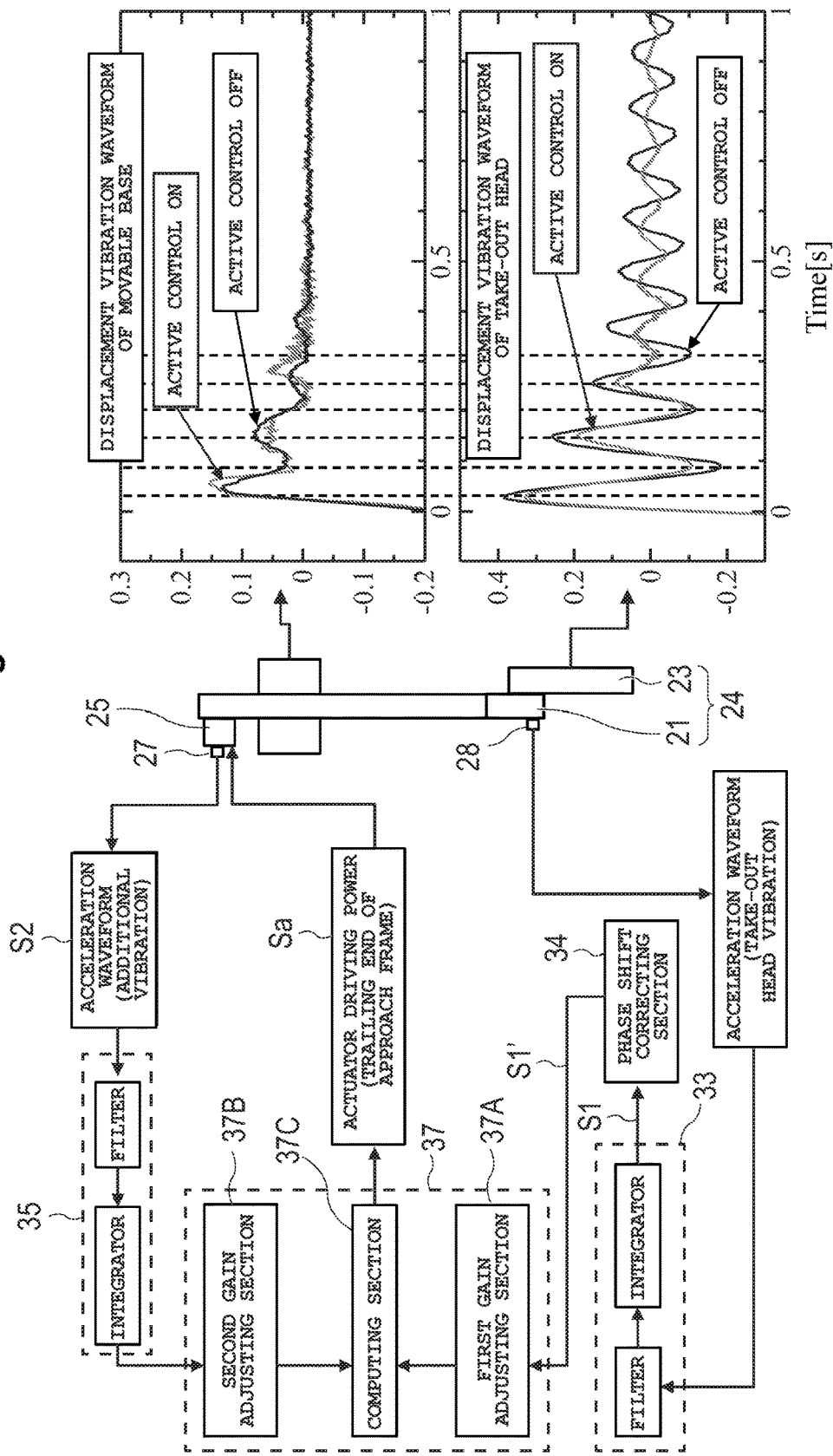
FIG. 4 illustrates, using waveforms, the course of generating a drive signal for an actuator.

FIG. 4 illustrates components for, and the course of, generating the drive signal Sa for the electromagnetic actuator 25. As illustrated in FIG. 4, the drive signal generating section 37 is constituted from a first gain adjusting section 37A, a second gain adjusting section 37B, and a computing section 37C. The first gain adjusting section 37A adjusts the gain of the corrected displacement vibration detection signal S1' outputted from the phase shift correcting section 34. The second gain adjusting section 37B adjusts the gain of the additional vibration detection signal S2' outputted from the additional vibration detecting section 35. The first gain adjusting section 37A and the second gain adjusting section 37B enable computation by adjusting the difference in dimension and amplitude between the corrected displacement vibration detection signal S1' and the additional vibration detection signal S2'. The computing section 37C executes computation to remove the additional vibration detection signal S2', which has been subjected to the gain adjustment, from the corrected displacement vibration detection signal S1', which has been subjected to the gain adjustment, as computation to reduce or eliminate the effect due to the additional vibration frequency component generated by the additional vibration of the actuator and included in the displacement vibration frequency component. If the polarity of the output from the acceleration sensor 27 is negative, the computing section 37C performs an addition.

The active vibration suppressing system 31 is preferably operating at all times when the apparatus for taking out a molded product is in operation. With this configuration, a vibration of the attachment 24 is suppressed at all times. Thus, it is possible to take out a molded product without deforming the molded product, and to prevent the molded product, which has not been completely cured, from being deformed after being taken out by the take-out head. In addition, the molded product can be taken out early and reliably by the attachment 24 if the active vibration suppressing system 31 is in operation at least when the attachment 24 is being stopped in the molding die of the molding machine.

Further, the active vibration suppressing system 31 may be in operation when the attachment 24 is being stopped at a releasing position. With this configuration, it is possible to prevent the molded product, which has not been completely cured, from being deformed.

<Configuration of Electromagnetic Actuator>

Figure 5A:
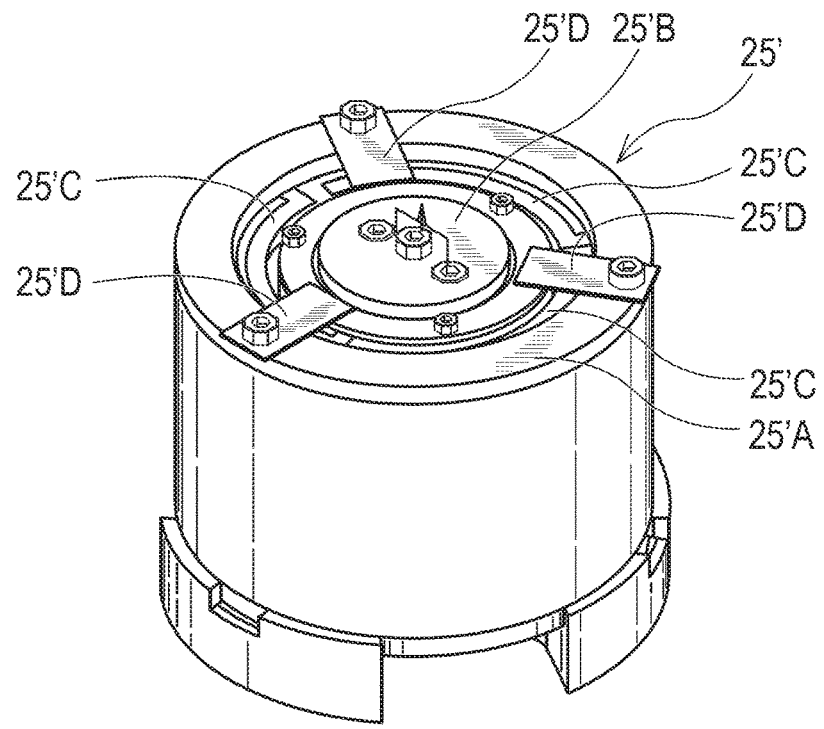
FIGS. 5A and 5B are a perspective view and a sectional view, respectively, of an example electromagnetic actuator that can be used in the embodiment.
Figure 5B:
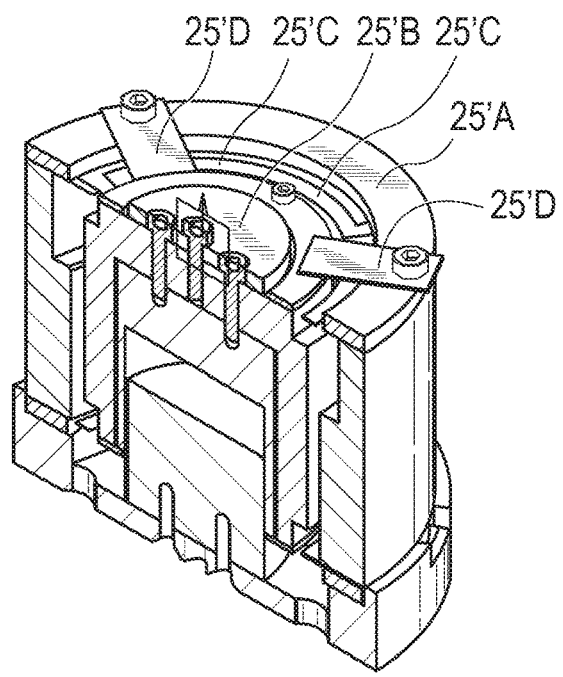

FIGS. 5A and 5B are a perspective view and a sectional view, respectively, of an example electromagnetic actuator 25' that can be used in the embodiment. In the electromagnetic actuator 25', a mover 25'B is disposed at the center portion of a tubular stator 25'A, and the mover 25'B is supported on the stator 25'A by three plate springs 25'C. The movable range of the mover 25'B is restricted by stoppers 25'D. The electromagnetic actuator 25' operates by the same principle as a so-called cylindrical linear motor. The stator 25'A is fixed to the take-out head, and the active control is performed when a vibration of the mover 25'B is transmitted to the stator 25'A. The acceleration sensor 27 discussed earlier is attached to the mover 25'B.

<Modifications>

In the embodiment described above, the acceleration sensor 28 is not used as a sensor portion of the displacement vibration detecting section 33. As a matter of course, however, the acceleration sensor 28 can be used as the displacement vibration detecting section 33 if the acceleration sensor 28 has high heat resistance. Also in that case, the feedback control is the same as the one described above. Using a three-axis acceleration sensor as the acceleration sensor 28 allows detection of vibrations of the attachment 24 in the X direction, the Y direction, and the Z direction.

In the embodiment described above, one electromagnetic actuator 25 operable to suppress a vibration in the Y direction is provided at the upper end portion of the approach frame 19. As a matter of course, however, two additional electromagnetic actuators operable to suppress vibrations in the X direction and the Z direction may be provided at the upper end portion of the approach frame 19.

In the embodiment described above, the electromagnetic actuator 25 is mounted on the approach frame 19 operable to take out a molded product from the molding die using the attachment 24 which is provided at the approach frame 19. As a matter of course, however, the active control may be performed with the electromagnetic actuator mounted at the upper end portion of the approach frame 19 of the runner elevating unit 8.

<Operation Period>

The active vibration suppressing system 31 preferably performs active control for a period from the time before the molded product is taken out of the molding die using the attachment 24 which is provided at the approach frame 19 or before an insert component is inserted into the molding die until the molded product is released at a releasing position. This not only increases the speed of taking out the molded product and inserting the insert component, but also effectively prevents the molded product from being deformed by a vibration applied before the molded product is cured.

Second Embodiment

Figure 6A:
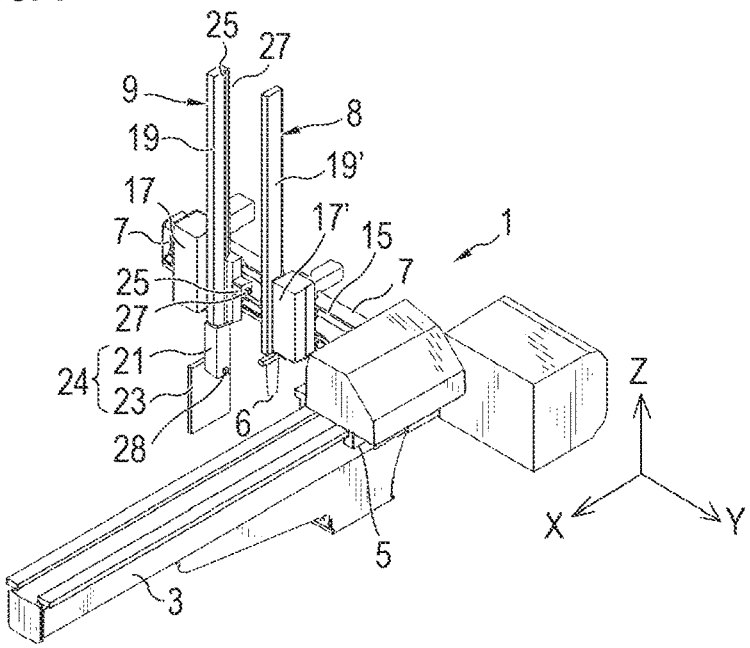
FIGS. 6A and 6B are a schematic perspective view and an enlarged perspective view of an essential portion, respectively, of an apparatus for taking out a molded product according to a second embodiment of the present invention.
Figure 6B:
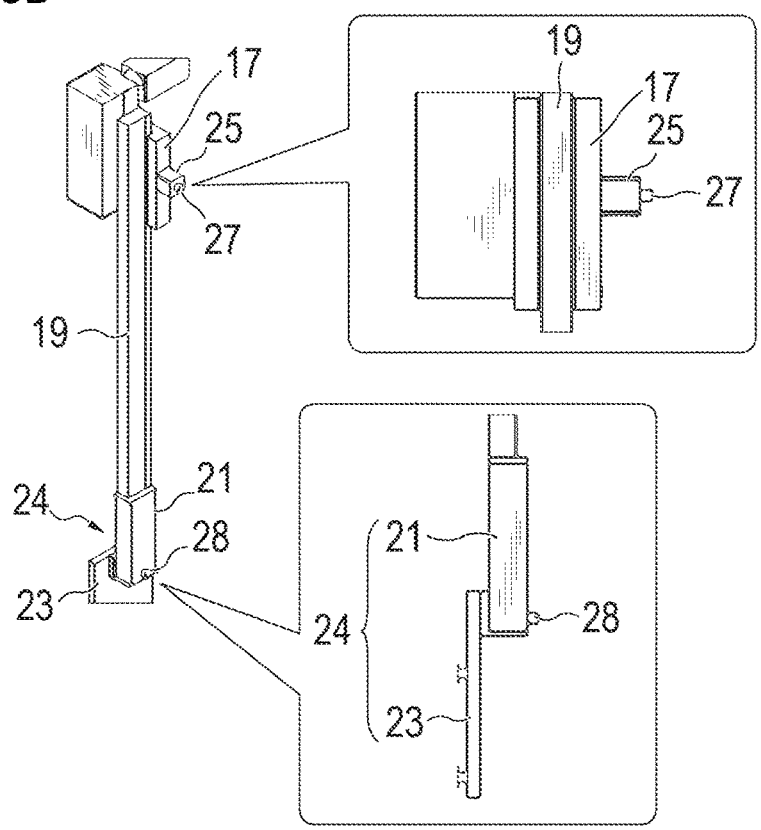
Figure 7:
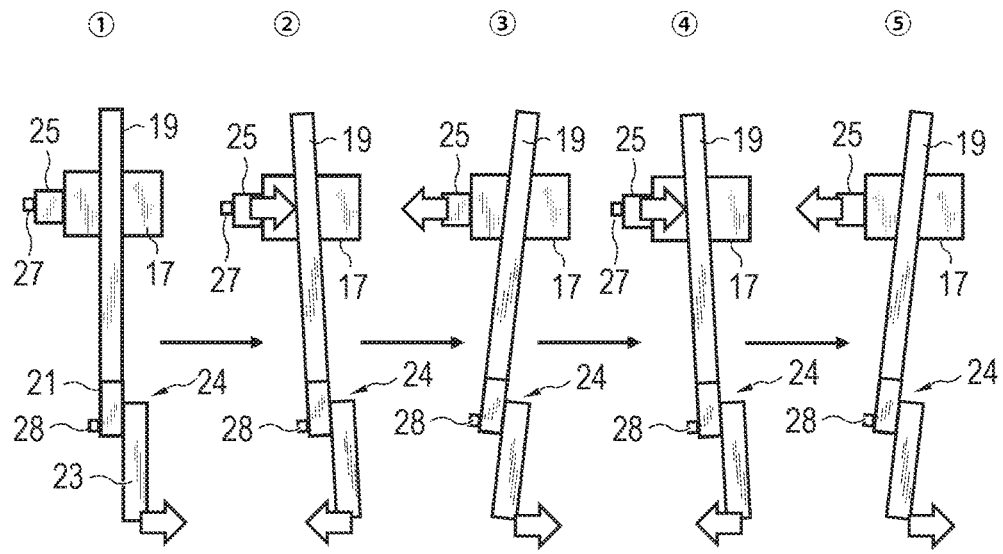
FIG. 7 illustrates operation of the second embodiment.

FIGS. 6A and 6B are a schematic perspective view and an enlarged perspective view of an essential portion, respectively, of an apparatus for taking out a molded product according to a second embodiment of the present invention. In FIGS. 6A and 6B, constituent parts that are the same as those of the apparatus for taking out a molded product according to the first embodiment illustrated in FIGS. 1A and 1B are denoted by the same reference numerals as those used in FIGS. 1A and 1B and the description thereof is omitted. The second embodiment differs from the first embodiment in that the electromagnetic actuator 25 is mounted on the movable base 17. In the embodiment, as illustrated in FIG. 7, a vibration of the actuator 24 is suppressed by detecting a displacement vibration of the attachment 24, which is provided at the leading end of the approach frame 19, using the acceleration sensor 28; detecting an additional vibration of the electromagnetic actuator 25, which is provided on the movable base 17, using the acceleration sensor 27; and causing the movable base 17 to operate such that motion that resists motion of the attachment 24 (point of action) is applied to the approach frame 19 with the movable base 17 serving as the point of fulcrum. In FIG. 7, in order to suppress motion of the attachment 24, the electromagnetic actuator 25 is caused to make motion as indicated by the white arrows, as a result of which the actuator 24 makes motion as indicated by the black arrows. In this example, operation of the active vibration suppressing system 31 is practically the same as that illustrated in FIG. 4. From the viewpoint of the relationship with the phase of the displacement vibration of the attachment 24, the active vibration suppressing system suppresses the displacement vibration of the attachment 24 by causing the one or more electromagnetic actuators 25 to generate a vibration in a phase delayed by $0 \leq \varphi < \pi/4$ from that of the displacement vibration of the attachment 24. In this case, the movable base 17 serves as the point of fulcrum of the approach frame 19. Thus, in theory, a displacement vibration of the attachment 24 can be suppressed by applying to the movable base 17 a vibration in the same phase as the displacement vibration of the attachment 24. In practice, however, there is a delay in transmission of a force from the movable base 17 to the approach frame 19, and therefore the one or more electromagnetic actuators are preferably caused to generate a vibration in a phase delayed by $0 \leq \varphi < \pi/4$ from that of the displacement vibration of the attachment.

Figure 8:
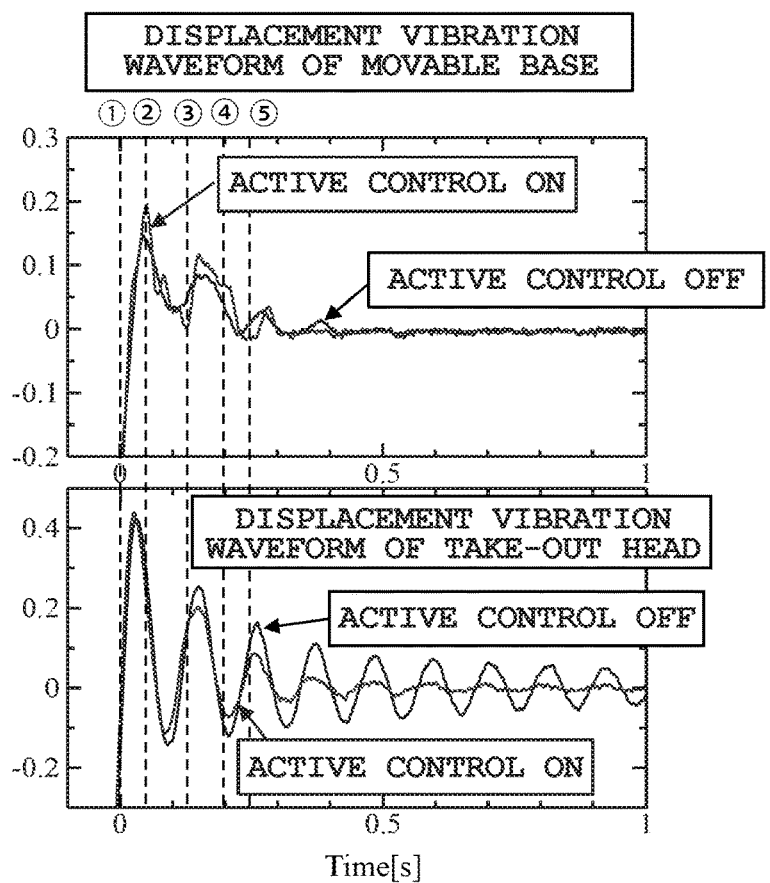
FIG. 8 illustrates the state of displacement vibration of a movable base and the state of displacement vibration of a take-out head attached to an attachment during active control and non-active control.

FIG. 8 illustrates the state of displacement vibration of the movable base and the state of displacement vibration of the take-out head 23 attached to the attachment during active operation of FIG. 7. As seen when comparing waveforms when active control is not performed (during non-active control) and when active control is performed (during active control), a vibration of the take-out head can be suppressed in a short time when active control is performed.

Figure 9:
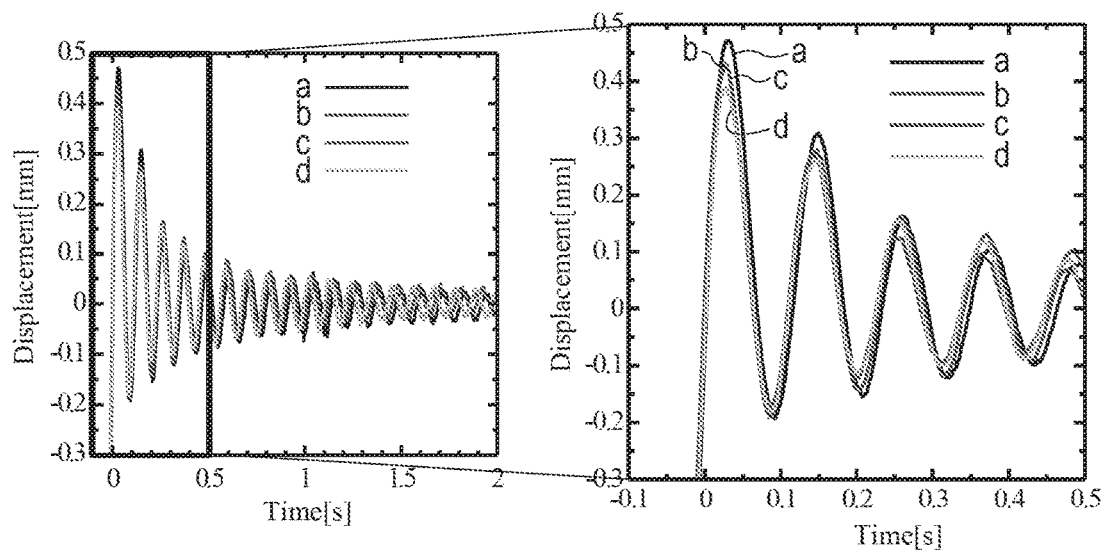
FIG. 9 illustrates the state of vibration of the attachment during pull-out operation without active control as measured by a laser displacement gauge in comparative examples and examples of the present invention.
Figure 10:
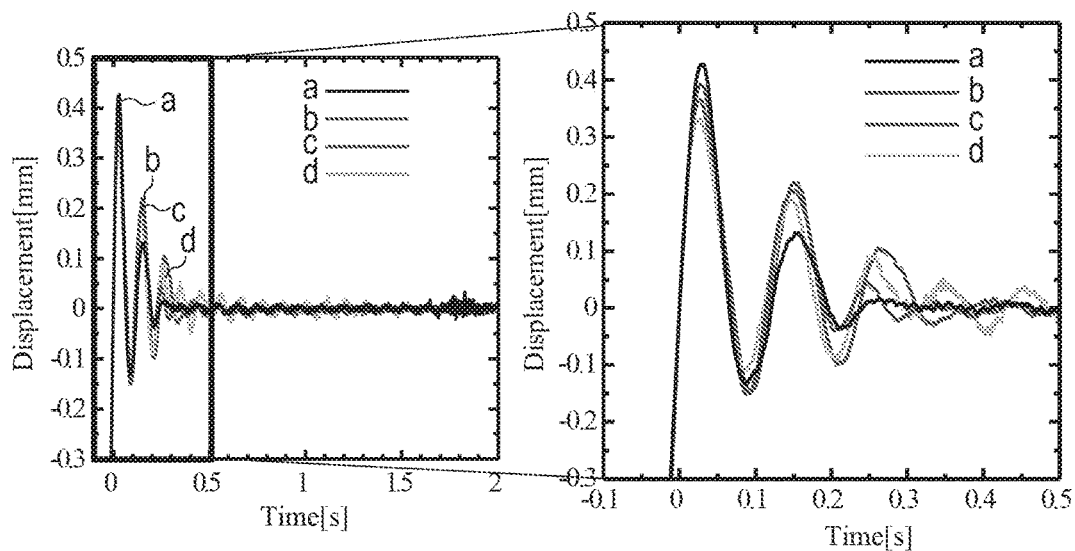
FIG. 10 illustrates the state of vibration of the attachment during pull-out operation with active control as measured by a laser displacement gauge in the comparative examples and the examples of the present invention.

FIG. 9 illustrates the state of vibration of the attachment 24 during pull-out operation without active control as measured by a laser displacement gauge (available from Keyence Corporation (product name: IL-S100)) in comparative examples a and b and examples c and d in the embodiments of the present invention. FIG. 10 illustrates the state of vibration of the attachment 24 during pull-out operation with active control as measured by a laser displacement gauge (available from Keyence Corporation (product name: IL-S100)) in comparative examples a and b and examples c and d. In comparative example a, the electromagnetic actuator 25 is disposed on the reverse unit 21 of the attachment 24. In comparative example b, the electromagnetic actuator 25 is disposed at an intermediate position of the approach frame 19. Example c corresponds to the second embodiment (an example in which the electromagnetic actuator 25 is disposed on the movable base 17). Example d corresponds to the first embodiment (an example in which the electromagnetic actuator 25 is mounted at the upper end portion of the approach frame 19). From the results in FIG. 10, it is seen that a high vibration suppression performance was obtained when the actuator 25 was disposed close to the attachment 24 which was vibrating (comparative examples a and b) as a matter of course, and that a vibration was suppressed in about 0.3 seconds also in examples c and d. It was found from such results that the present invention was effective in suppressing a vibration.

Third Embodiment

Figure 11:
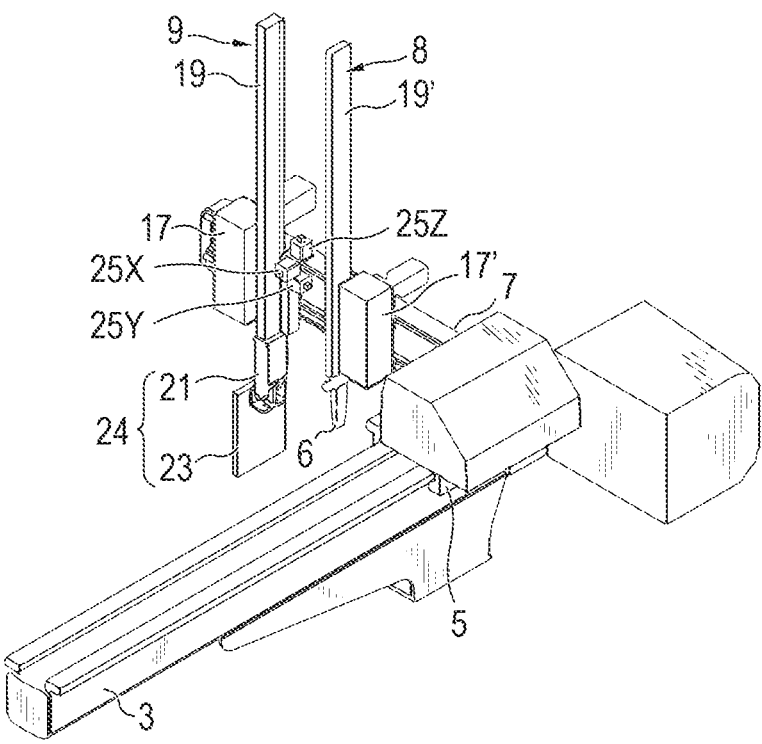
FIG. 11 is a perspective view illustrating an apparatus for taking out a molded product according to a third embodiment of the present invention.
Figure 12:
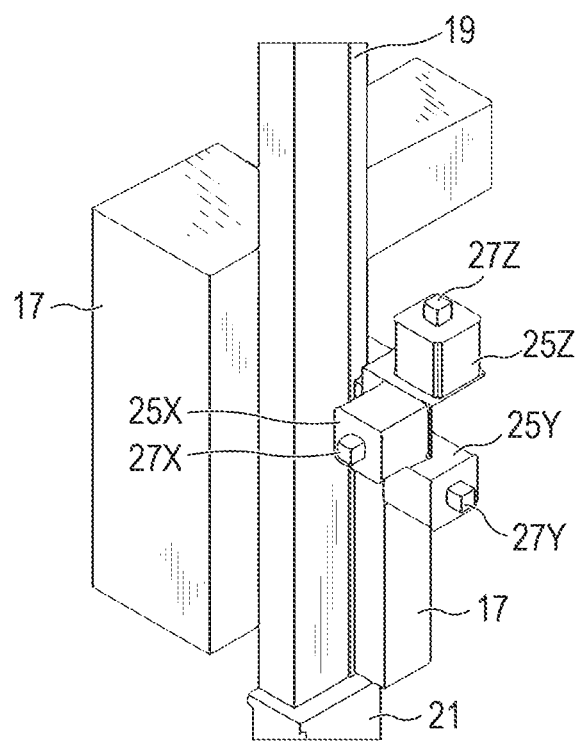
FIG. 12 is an enlarged view of an essential portion of the apparatus including three electromagnetic actuators provided on a movable base.

FIG. 11 is a perspective view illustrating an apparatus for taking out a molded product according to a third embodiment of the present invention. FIG. 12 is an enlarged view of an essential portion including three electromagnetic actuators 25X to 25Z provided on the movable base 17. In the embodiment, constituent parts that are the same as those of the apparatus for taking out a molded product according to the second embodiment illustrated in FIGS. 6A and 6B are denoted by the same reference numerals as those used in FIGS. 6A and 6B and the description thereof is omitted. The third embodiment differs from the second embodiment in that three electromagnetic actuators 25X, 25Y, and 25Z are mounted on the movable base 17 to suppress vibrations of the attachment 24 in the X direction, the Y direction, and the Z direction, and that acceleration sensors 27X, 27Y, and 27Z are attached to the three electromagnetic actuators 25X, 25Y, and 25Z, respectively, of the movable base 17. Defining the Z direction as a direction in which one of the one or more approach frames 19 is elevated and lowered, the Y direction as a direction orthogonal to the Z direction, in which the attachment mounted on the one of the one or more approach frames approaches to or retracts from the molded product within the molding die, and the X direction as a direction orthogonal to the Y and Z directions, the three electromagnetic actuators 25X to 25Z include a first electromagnetic actuator 25Y operable to suppress a displacement vibration of the attachment as caused in the Y direction, a second electromagnetic actuator 25X operable to suppress a displacement vibration of the attachment as caused in the X direction, and a third electromagnetic actuator 25Z operable to suppress a displacement vibration of the attachment as caused in the Z direction. When the first to third electromagnetic actuators 25X to 25Z are provided, the active control can be performed at all times no matter what route the approach frame 19 is moved along and no matter what position the approach frame 19 is stopped at. In the embodiment, the acceleration sensor 28 which is used as the displacement vibration detecting section 33 is a three-axis acceleration sensor operable to detect vibrations in the X direction, the Y direction, and the Z direction.

In the third embodiment described above, three electromagnetic actuators are mounted to suppress vibrations as caused in the X, Y, and Z directions. However, the present invention does not require application of the active control to suppression of vibrations as caused in three directions as an essential requirement as long as the active control is adopted to suppress a vibration as caused in a certain direction that affects deformation of the molded product most. In particular, since a vibration in the Z direction is small, it is practical to apply the active control to suppression of a vibration as caused in the X direction in addition to suppression of a vibration as caused in the Y direction.

Fourth Embodiment

Figure 13A:
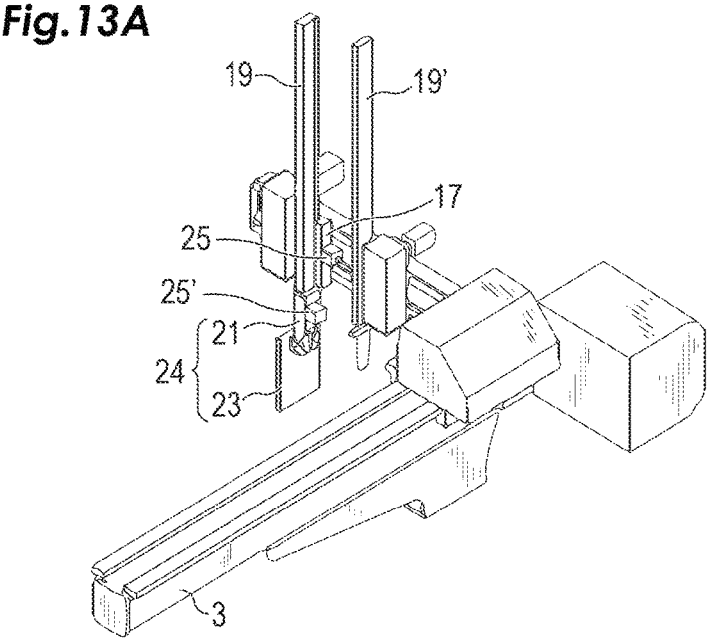
FIGS. 13A to 13C are a perspective view, an enlarged view of an essential portion, and a perspective view, respectively, of an apparatus for taking out a molded product according to a fourth embodiment of the present invention.
Figure 13B:
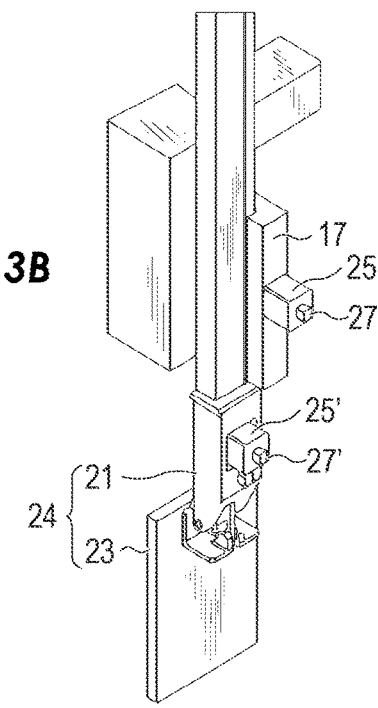
Figure 13C:
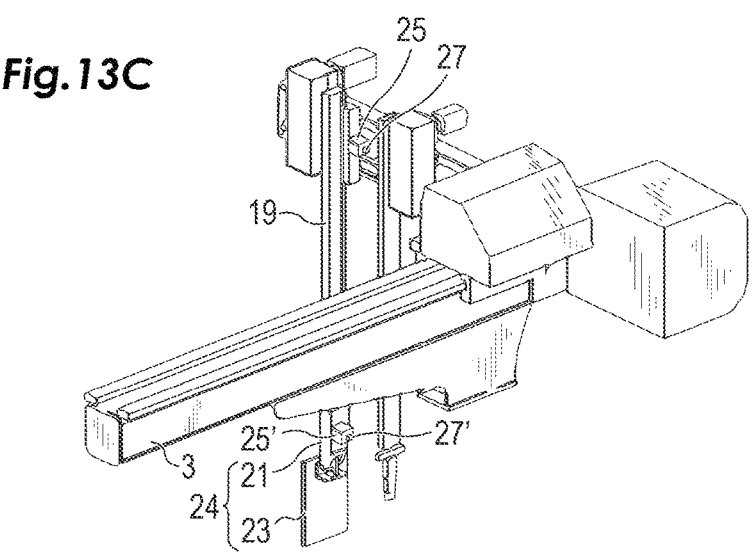

FIGS. 13A to 13C are a perspective view, an enlarged view of an essential portion, and a perspective view, respectively, of an apparatus for taking out a molded product according to a fourth embodiment of the present invention. In the embodiment, constituent parts that are the same as those of the apparatus for taking out a molded product according to the second embodiment illustrated in FIGS. 6A and 6B are denoted by the same reference numerals as those used in FIGS. 6A and 6B and the description thereof is omitted. The fourth embodiment differs from the second embodiment in that the electromagnetic actuator 25' is also mounted on the reverse unit 21 of the attachment 24. In the embodiment, the two electromagnetic actuators 25 and 25' disposed at different positions are used in active control to suppress a vibration of the attachment 24. The electromagnetic actuator 25' provided on the reverse unit 21 applies to the attachment 24 a vibration opposite in phase to the displacement vibration of the attachment 24 to perform double active control. Double active control similar to that in the embodiment may be performed when the electromagnetic actuator 25 is disposed at a portion of one approach frame 19. That portion is positioned opposite to the attachment 24 with respect to the movable base 17 illustrated in FIGS. 1A and 1B. As a matter of course, a second electromagnetic actuator 25' may be provided on the take-out head 23 or the approach frame 19, rather than the reverse unit 21.

Figure 14:
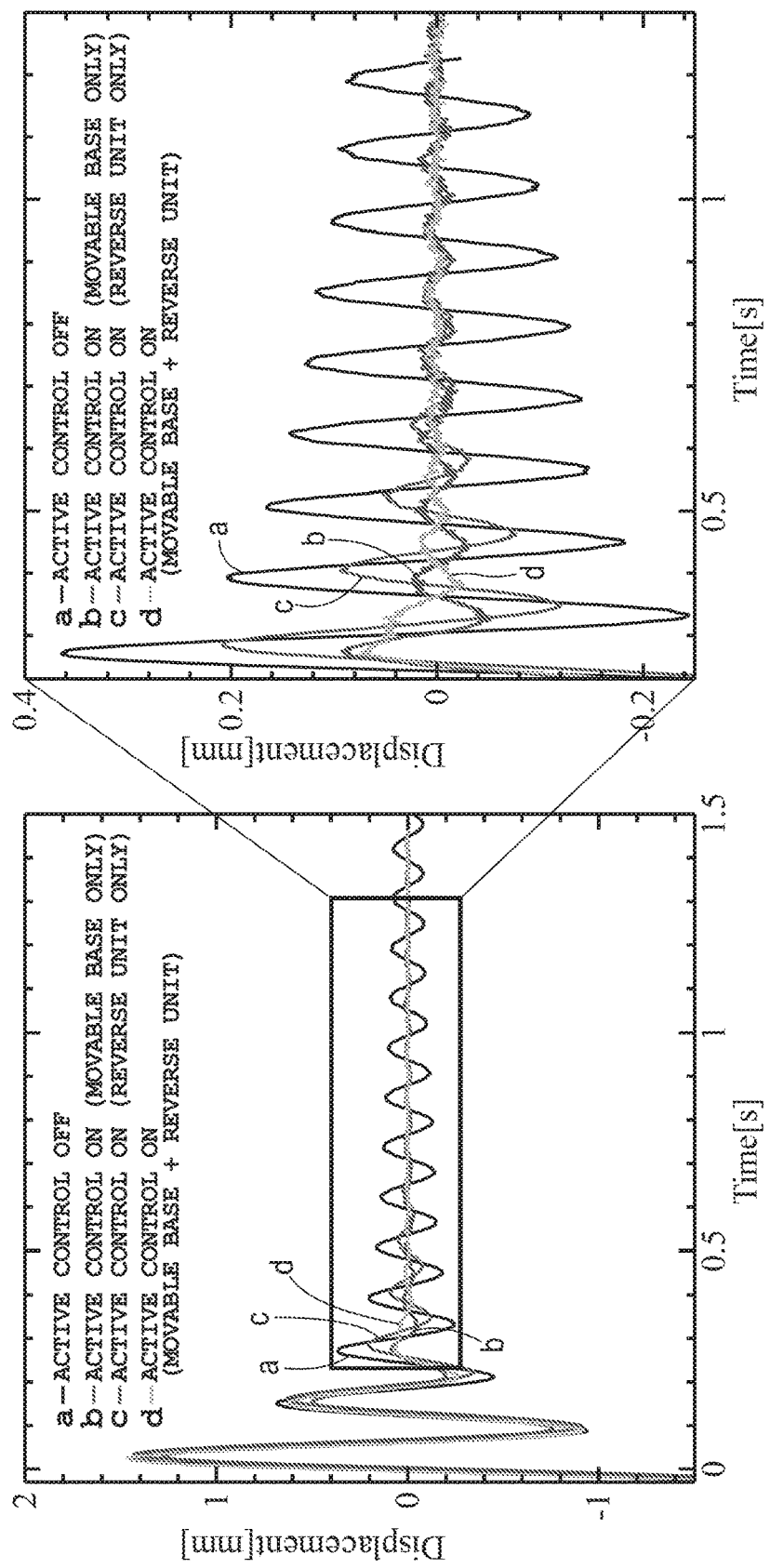
FIG. 14 illustrates the results of a test for verifying the effect of the fourth embodiment.

FIG. 14 illustrates the state of vibration of the attachment during pull-out operation without active control being performed as measured by a laser displacement gauge (available from Keyence Corporation; product name: IL-S100) (comparative example a), the state of vibration of the attachment 24 during pull-out operation with active control being performed with only the electromagnetic actuator 25 mounted on the movable base 17 as measured by the laser displacement gauge (comparative example b), the state of vibration of the attachment 24 during pull-out operation with active control being performed with only the electromagnetic actuator 25' mounted on the reverse unit 21 as measured by the laser displacement gauge (example c), and the state of vibration of the attachment 24 during pull-out operation with active control being performed with the electromagnetic actuator 25 mounted on the movable base 17 and with the electromagnetic actuator 25' mounted on the reverse unit 21 as measured by the laser displacement gauge (example d).

From the results in FIG. 14, it is known that a high vibration suppression performance was obtained with active control (b to d) compared to the example without active control (a), and that a vibration was suppressed the most quickly particularly when active control was performed with the electromagnetic actuator 25 mounted on the movable base 17 and with the electromagnetic actuator 25' mounted on the reverse unit 21.

Fifth Embodiment

Figure 15A:
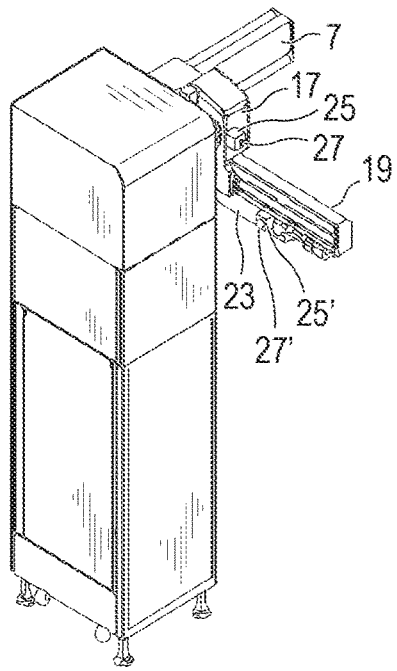
FIGS. 15A to 15D are perspective views and an enlarged view of an essential portion of the apparatus according to a fifth embodiment of the present invention.
Figure 15B:
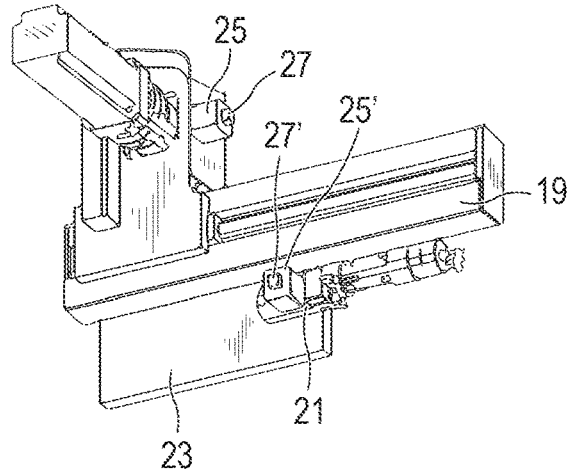
Figure 15C:
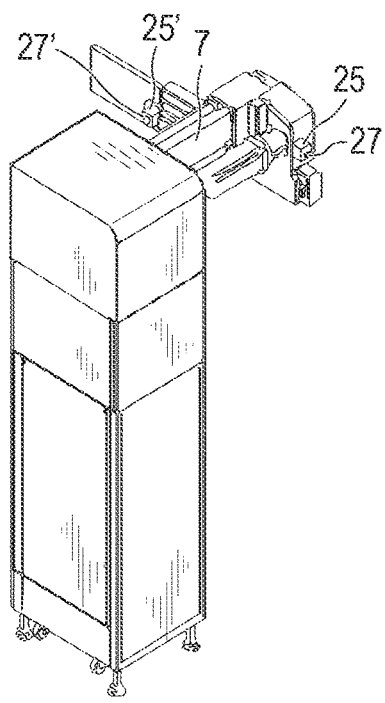
Figure 15D:
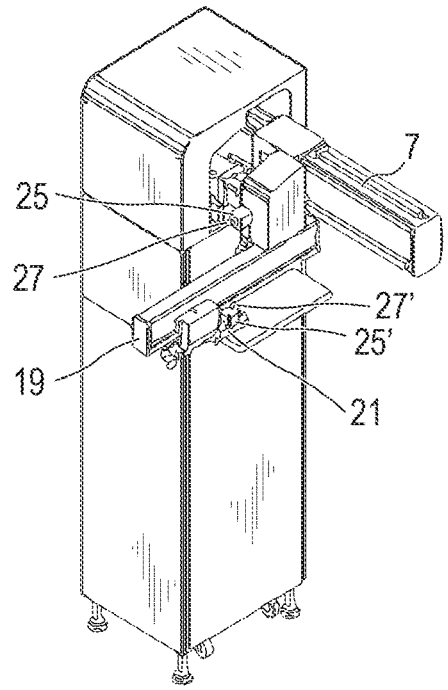

FIG. 15A is a schematic perspective view of a fifth embodiment of the present invention. FIG. 15B is an enlarged perspective view of an essential portion of the fifth embodiment. FIGS. 15C and 15D are schematic perspective views of the fifth embodiment as seen in different directions. In FIGS. 15A to 15D, constituent parts that are the same as those of the apparatus for taking out a molded product according to the fourth embodiment illustrated in FIGS. 13A to 13C are denoted by the same reference numerals as those used in FIGS. 13A to 13C. In the embodiment, the apparatus for taking out a molded product is of a so-called side entry type in which the approach frame 19 is moved in the horizontal direction to advance the attachment 24 into a molding die of a molding machine, not illustrated. The fifth embodiment differs from the fourth embodiment in that no lateral frame is provided, and that the approach frame 19, which is movably supported by the transfer body 17 movably mounted on the pull-out frame 7, is movable in the horizontal direction (Y direction). Also in the embodiment, the electromagnetic actuator 25 is provided on the movable base 17, and the electromagnetic actuator 25' is mounted on the reverse unit 21 of the attachment 24. As in the first embodiment, the displacement vibration detecting section, which is operable to output a displacement vibration detection signal including information on a displacement vibration frequency component proportional to a displacement vibration of the attachment 24, detects, as the displacement vibration detection signal, a motor current signal or a motor torque signal of the servomotor 13 used in the servomechanism operable to move the approach frame 19 in the horizontal direction (Y direction), or a signal proportional to the motor current signal or the motor torque signal. The displacement vibration of the take-out head 23 can be suppressed early by causing the electromagnetic actuators 25 and 25' to operate to perform active control also when the approach frame 19 is advanced in the horizontal direction (lateral direction) into the molding die of the molding machine as in the embodiment.

INDUSTRIAL APPLICABILITY

According to the present invention, the distance between the attachment at the take-out position and one or more electromagnetic actuators is long. However, there exists a relatively large space around the movable base and around a portion of the approach frame, positioned opposite to the attachment with respect to the movable base. Therefore, one or more electromagnetic actuators having power required to suppress a displacement vibration of the attachment can be mounted without caring about a collision with an object in the surroundings. Further, if one or more electromagnetic actuators are mounted on the movable base, a vibration of the electromagnetic actuators can be amplified utilizing the weight of the movable base, thereby enhancing the vibration suppressing effect.

What is claimed is:
1. An apparatus for taking out a molded product, comprising:
a positioning servomechanism;
a pull-out frame;
one or more movable bases movably provided on the pull-out frame and controlled by the positioning servomechanism;
one or more approach frames respectively attached to the movable bases;
one or more attachments respectively mounted at leading ends of the approach frames; and
an active vibration suppressing system configured to perform active control to suppress a displacement vibration of the one or more attachments using a vibration generated by driving one or more actuators, wherein:

the one or more actuators are one or more electromagnetic actuators; and the one or more electromagnetic actuators are disposed at one or more movable bases;

the active vibration suppressing system includes a displacement vibration detecting section configured to detect the displacement vibration of the one or more attachments;

the displacement vibration detecting section drives the one or more electromagnetic actuators so as to reduce the displacement vibration detected by the displacement vibration detecting section; and, the active vibration suppressing system suppresses the displacement vibration of the attachment by causing the one or more electromagnetic actuators to generate a vibration in a phase delayed by $0 \leq \varphi < \pi/4$ from that of the displacement vibration of the attachment.

2. The apparatus for taking out a molded product according to claim 1, wherein the one or more approach frames include an approach frame having an attachment mounted at a leading end thereof and configured to take out a molded product from a molding die of a molding machine or to be attached with an insert component to be inserted into the molding die, and an approach frame having an attachment configured to remove a waste part from the molded product.

3. The apparatus for taking out a molded product according to claim 1, wherein defining a Z direction as a direction in which one of the one or more approach frames is elevated and lowered, a Y direction as a direction orthogonal to the Z direction, in which the attachment mounted on the one of the one or more approach frames approaches to or retracts from the molded product within the molding die, and an X direction as a direction orthogonal to the Y and Z directions, the one or more electromagnetic actuators include a first electromagnetic actuator operable to suppress at least the displacement vibration of the attachment as caused in the Y direction.

4. The apparatus for taking out a molded product according to claim 1, wherein the one or more electromagnetic actuators further include:

a third electromagnetic actuator operable to suppress the displacement vibration of the attachment as caused in the Z direction.

5. The apparatus for taking out a molded product according to claim 1, wherein:

a motor included in the positioning servomechanism operable to move one of the one or more movable bases is constituted from an AC servomotor; and a transport mechanism of belt-type, rope-type, or carriage-type is provided between the AC servomotor and the movable base.

6. An apparatus for taking out a molded product, comprising:

a positioning servomechanism;

a pull-out frame;

one or more movable bases movably provided on the pull-out frame and controlled by the positioning servomechanism;

one or more approach frames respectively attached to the movable bases;

one or more attachments respectively mounted at leading ends of the approach frames; and an active vibration suppressing system configured to perform active control to suppress a displacement vibration of the one or more attachments using a vibration generated by driving one or more electromagnetic actuators, wherein the one or more electromagnetic actuators are disposed on the one or more movable bases and the attachments provided on the one or more approach frames are held by the one or more movable bases;

defining a Z direction as a direction in which one of the one or more approach frames is elevated and lowered, a Y direction as a direction orthogonal to the Z direction, in which the attachment mounted on the one of the one or more approach frames approaches to or retracts from the molded product within the molding die, and an X direction as a direction orthogonal to the Y and Z directions, the one or more electromagnetic actuators include:

a first electromagnetic actuator operable to suppress the displacement vibration of the attachment as caused in the Y direction; and a second electromagnetic actuator operable to suppress the displacement vibration of the attachment as caused in the X direction.

7. The apparatus for taking out a molded product according to claim 6, wherein:

the active vibration suppressing system includes a displacement vibration detecting section configured to detect the displacement vibration of the one or more attachments; and the displacement vibration detecting section drives the one or more electromagnetic actuators so as to reduce the displacement vibration detected by the displacement vibration detecting section.

8. The apparatus for taking out a molded product according to claim 6, wherein the one or more electromagnetic actuators further include:

a third electromagnetic actuator operable to suppress the displacement vibration of the attachment as caused in the Z direction.

9. The apparatus for taking out a molded product according to claim 6, wherein:

a motor included in the positioning servomechanism operable to move one of the one or more movable bases is constituted from an AC servomotor; and a transport mechanism of belt-type, rope-type, or carriage-type is provided between the AC servomotor and the movable base.

10. An apparatus for taking out a molded product comprising:

a positioning servomechanism;

a pull-out frame;

one or more movable bases movably provided on the pull-out frame and controlled by the positioning servomechanism;

one or more approach frames respectively attached to the movable bases;

one or more attachments respectively mounted at leading ends of the approach frames; and an active vibration suppressing system configured to perform active control to suppress a displacement vibration of the one or more attachments using a vibration generated by driving one or more actuators, wherein:

the one or more actuators are one or more electromagnetic actuators; and the one or more electromagnetic actuators are disposed at at least one of the one or more movable bases, or the one or more electromagnetic actuators are disposed at a portion of one of the approach frames positioned opposite to the attachment mounted on the one of the approach frames with respect to one of the movable bases;

defining a Z direction as a direction in which one of the one or more approach frames is elevated and lowered, a Y direction as a direction orthogonal to the Z direction, in which the attachment mounted on the one of the one or more approach frames approaches to or retracts from the molded product within the molding die, and an X direction as a direction orthogonal to the Y and Z directions, the one or more electromagnetic actuators include:

a first electromagnetic actuator operable to suppress the displacement vibration of the attachment as caused in the Y direction; and a second electromagnetic actuator operable to suppress the displacement vibration of the attachment as caused in the X direction.

* * * * *